United States Patent
Asakura

(10) Patent No.: US 11,752,791 B2
(45) Date of Patent: Sep. 12, 2023

(54) PRINTING SYSTEM, PRINTING CONTROL PROGRAM, AND PRINT PRODUCING METHOD

(71) Applicant: SEIKO EPSON CORPORATION, Tokyo (JP)

(72) Inventor: Haruki Asakura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 17/464,896

(22) Filed: Sep. 2, 2021

(65) Prior Publication Data

US 2022/0072882 A1 Mar. 10, 2022

(30) Foreign Application Priority Data

Sep. 4, 2020 (JP) .................. 2020-148815

(51) Int. Cl.
  *B41J 29/38* (2006.01)
  *B41J 3/28* (2006.01)
  *B41J 11/00* (2006.01)

(52) U.S. Cl.
  CPC .................. *B41J 29/38* (2013.01); *B41J 3/28* (2013.01); *B41J 11/008* (2013.01)

(58) Field of Classification Search
  CPC . B41J 11/02; B41J 11/06; B41J 11/008; B41J 29/38
  See application file for complete search history.

(56) References Cited

U.S. PATENT DOCUMENTS

| 9,656,492 | B2 | 5/2017 | Leynadier et al. |
| 2019/0263149 | A1* | 8/2019 | Hiruma .................... B41J 11/06 |
| 2020/0382670 | A1* | 12/2020 | Nakamoto ........... H04N 1/0066 |

FOREIGN PATENT DOCUMENTS

| JP | 2010211812 A | * | 9/2010 |
| WO | 2014/207007 A1 | | 12/2014 |

OTHER PUBLICATIONS

Murakami, MachineTranslationofJP-2010211812-A, 2010 (Year: 2010).*

* cited by examiner

*Primary Examiner* — Scott A Richmond

(74) *Attorney, Agent, or Firm* — Global IP Counselors, LLP

(57) ABSTRACT

A printing system includes a media table on which a medium is placed, a printing mechanism configured to perform printing while moving relatively to the medium placed on the media table, and a control section configured to determine presence or absence of possibility of double printing in the same position of one medium and perform warning when the possibility is present.

11 Claims, 7 Drawing Sheets

PRINTING SYSTEM, PRINTING CONTROL PROGRAM, AND PRINT PRODUCING METHOD

The present application is based on, and claims priority from JP Application Serial Number 2020-148815, filed Sep. 4, 2020, the disclosure of which is hereby incorporated by reference herein in its entirety.

BACKGROUND

1. Technical Field

The present disclosure relates to a printing system, a printing control program, and a print producing method.

2. Related Art

There has been known a flatbed-type printer. In the flatbed-type printer, a gantry mounted with a print head moves back and forth and the print head moves to the left and the right on a media table on which a medium to be printed is placed, whereby printing on the medium is performed. In such a flatbed-type printer, a plurality of images can be printed on one medium: for example, one image is printed at the left end of one medium and another image is printed in a region adjacent to the left end of the medium.

When a plurality of images respectively corresponding to a plurality of printing jobs are printed on one medium in this way, a user needs to designate printing start positions of the images. However, for example, after printing of an image corresponding to a printing job 1, when an image corresponding to a printing job 2 is printed while a change of a printing start position is forgot, as shown in FIG. 10, the image of the printing job 1 and the image of the printing job 2 are printed from the same printing start position T11. Accordingly, the two images are printed to overlap each other. For example, when a printing start position of the image of the printing job 2 is changed but a printing start position T12 after the change is a position within a region of the image of the printing job 1, as shown in FIG. 11, the two images are still printed to overlap each other.

In contrast, WO 2014/207007 (Patent Literature 1) discloses a technique for, in a flatbed printer, projecting a digital image toward a flatbed surface with a projector system in order to show, to an operator, a position on a flat medium piece on which the digital image is intended to be printed.

However, in the technique disclosed in Patent Literature 1, cost increases because a projector is necessary.

SUMMARY

A printing system according to an aspect of the present disclosure includes: a media table on which a medium is placed; a printing mechanism configured to perform printing while moving relatively to the medium placed on the media table; and a control section configured to perform warning of possibility of double printing in a same position of one medium.

A non-transitory computer-readable storage medium according to an aspect of the present disclosure stores a program, the program causing a computer, which controls a printing mechanism that performs printing while moving relatively to a medium placed on a media table, to execute: a step of controlling the printing mechanism; and a step of performing warning of possibility of double printing in a same position of one medium.

A print producing method according to an aspect of the present disclosure includes: a printing step for producing a print by performing printing while moving relatively to a medium placed on a media table; and a warning step for performing warning of possibility of double printing in a same position of one medium.

DESCRIPTION OF EXEMPLARY EMBODIMENTS

Embodiments of the present disclosure are explained according to order described below.

(1) Configuration of a printing system in a first embodiment
(2) Printing control processing in the first embodiment
(3) Second Embodiment
(4) Other embodiments

(1) Configuration of a Printing System in a First Embodiment

Figure 1:
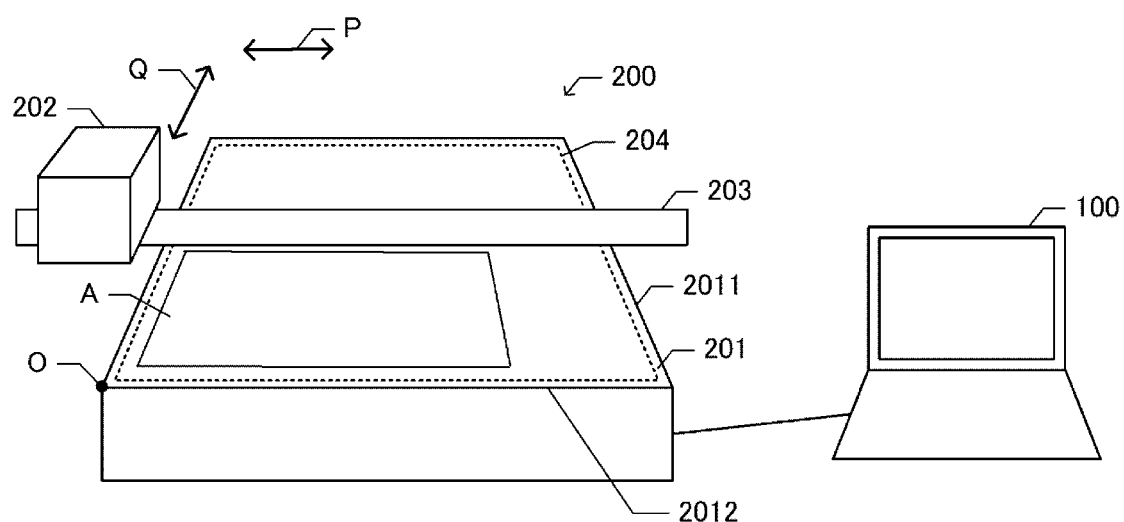
FIG. 1 is an overall configuration diagram of a printing system.

FIG. 1 is an overall configuration diagram of a printing system 10. The printing system 10 includes a control apparatus 100 and a printing apparatus 200. The control apparatus 100 and the printing apparatus 200 are coupled via an interface.

The control apparatus 100 is an information processing apparatus and controls printing by the printing apparatus 200. The user can perform setting of the printing apparatus 200 and an instruction of operation and check a state and setting of the printing apparatus 200 through the control apparatus 100.

The printing apparatus 200 is a so-called flatbed printer and includes a media table 201, a print head 202, a gantry 203, and an attracting mechanism 204. The media table 201 is a rectangular table and has a flat surface. A medium A to be printed is placed on the media table 201. The medium A is rectangular printing paper. The shape of the media table 201 and the medium A is not limited to the rectangle and may be any shape.

The gantry 203 is provided on the media table 201 to be movable in a direction along a longitudinal side 2011 of the media table 201. Further, the gantry 203 has a not-shown guide axis extending along a lateral side 2012 of the media table 201. The print head 202 is provided to be movable along the guide axis of the gantry 203. In the following explanation, a direction in which the print head 202 is movable on the gantry 203, that is, a direction along the lateral side 2012 of the media table 201 is referred to as main scanning direction P. A direction in which the gantry 203 is movable, that is, a direction along the longitudinal side 2011 of the media table 201 is referred to as sub-scanning direction Q.

The print head 202 ejects ink to a medium placed on the media table 201. The print head 202 moves in the main scanning direction P and the media table 201 ejects the ink in a process of the movement, whereby an image is formed on the medium. Further, the gantry 203 moves in the sub-scanning direction Q according to driving of a not-shown motor, whereby a two-dimensional image can be formed. The print head 202 can form a color image and a monochrome image by ejecting K (black) ink and chromatic color inks (for example, C (cyan) ink, M (magenta) ink, and Y (yellow) ink). The colors and the number of the inks are examples. The print head 202 may eject only the K (black) ink or may eject the inks of the other colors.

The attracting mechanism 204 includes a plurality of through-holes disposed at equal intervals across the entire surface of the media table 201 and a vacuum pump. The attracting mechanism 209 performs, with the vacuum pump, suction in the direction from the front surface to the rear surface of the media table 201 via the through-holes. Consequently, a medium A placed on the media table 201 is attracted to the media table 201. Consequently, it is possible to prevent the position of the medium A from deviating. ON and OFF of the attracting mechanism 204 are controlled by the user pressing a not-shown button provided in the printing apparatus 200. When the attracting mechanism 204 is turned on, attraction is started. When the attracting mechanism 204 is turned off, the attraction is released. When the attracting mechanism 204 is on, the attracting mechanism 204 operates such that an attracting force of the medium A to the media table 201 is equal to or larger than a threshold. When the attracting mechanism 204 is off, the attracting mechanism 204 operates such that the attracting force of the medium A to the media table 201 is smaller than the threshold. That is, when the attracting mechanism 204 is off, the suction by the vacuum pump functioning as the attracting mechanism 204 may not be completely off.

Figure 2:
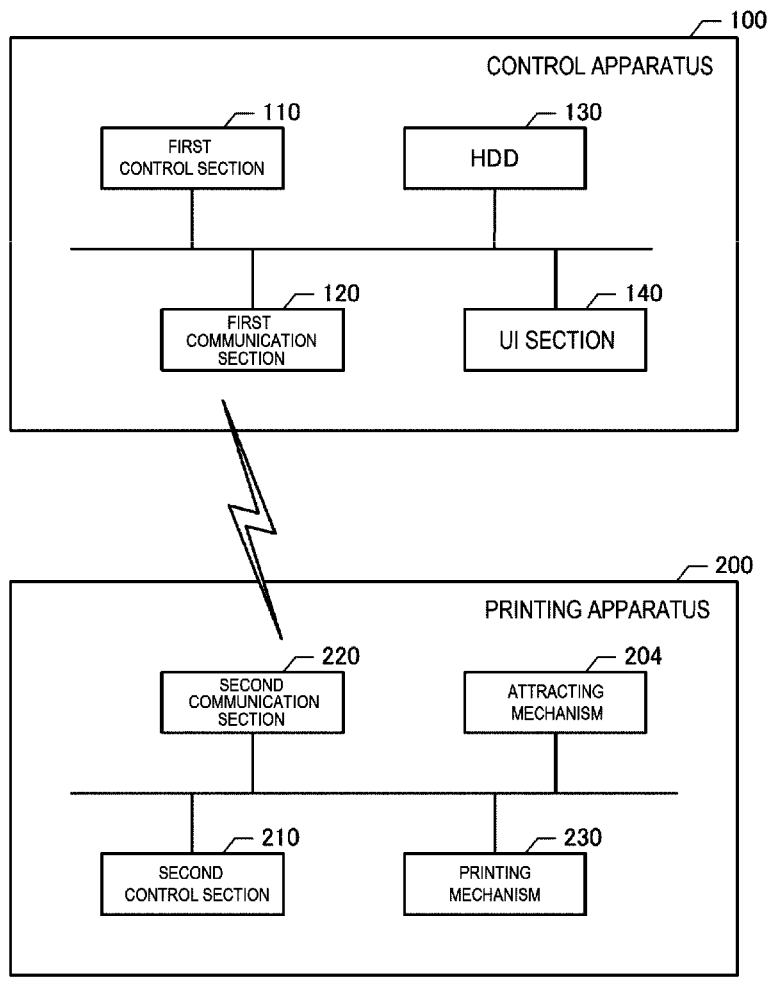
FIG. 2 is a hardware configuration diagram of a control apparatus and a printing apparatus.

FIG. 2 is a hardware configuration diagram of the control apparatus 100 and the printing apparatus 200. The control apparatus 100 includes a first control section 110, a first communication section 120, a HDD 130, and a UI section 140. The first control section 110 includes a processor such as a CPU, a ROM, and a RAM. The CPU executes various programs recorded in the ROM or the like using the RAM or the like, whereby the first control section 110 controls the sections of the control apparatus 100. The CPU executes a printing control program (a printer driver) recorded in the HDD 130 or the like, whereby the first control section 110 can control the printing apparatus 200. The first communication section 120 performs communication with other apparatuses connected by wire or radio according to various communication protocols. The hard disk device (HDD) 130 stores various kinds of information and various programs. The UI section 140 includes a display functioning as a display section and a keyboard and switches functioning as an input section.

Figure 3:
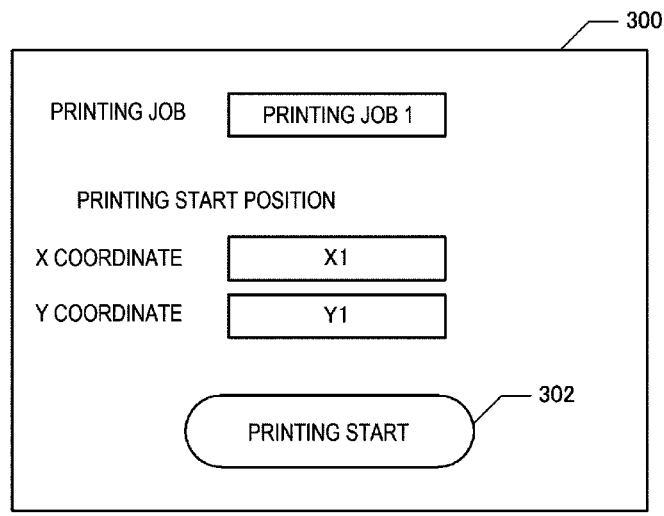
FIG. 3 is a diagram showing a printing setting screen.

FIG. 3 is a diagram showing a printing setting screen displayed on the display section of the UI section 140. On a printing setting screen 300, the user selects a printing job. The printing job includes a command described in a page description language and printing target image data. Further, the user designates a printing start position of a printing target image on the printing setting screen 300. The printing start position is information for designating a position in the media table 201. Although not displayed on the printing setting screen shown in FIG. 3, a printing size of the printing target image is also set according to user operation. The printing size is a size during printing of printing data included in the printing job.

Figure 4:
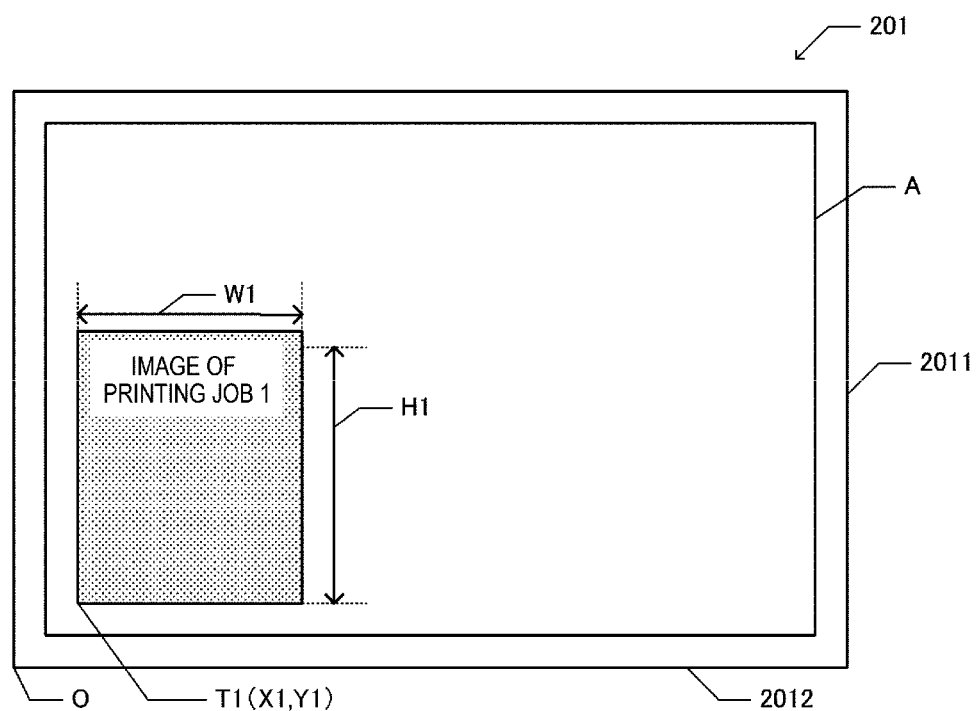
FIG. 4 is an explanatory diagram of a coordinate system in a media table.

FIG. 4 is an explanatory diagram of a coordinate system in the media table 201. In this embodiment, the printing start position is a position on the rightmost side in a sub-scanning direction shown in FIG. 4 and the nearest side in the sub-scanning direction Q in the medium A. The printing start position only has to be a predetermined position and is not limited to the embodiment. The printing start position is represented by a value (X, Y) of a two-dimensional coordinate system having the lower left vertex of the media table 201 as an origin O, having the lateral side 2012 as an X axis, and having the longitudinal side 2011 as a Y axis. The printing size is designated by height H and width W. The width W is length in an X-axis direction (the main scanning direction P) and the height H is length in a Y-axis direction (the sub-scanning direction Q).

When the printing size is input, the printing job is selected on the printing setting screen 300, and the printing start position is input and, then, a printing start button 302 is pressed, the first communication section 120 transmits a printing instruction to the printing apparatus 200. The printing instruction includes the printing job, the printing start position, and the printing size. As shown in FIG. 3, it is assumed that a printing job 1 is selected as the printing job and (X1, Y1) is designated as the printing start position. It is assumed that a printing size of an image of the printing job 1 is (W1, H1). In this case, as shown in FIG. 4, T1 (X1, Y1) is set as the printing start position. The image of the printing job 1 is printed in a region decided by the printing size (W1, H1).

Referring back to FIG. 2, the printing apparatus 200 includes a second control section 210, a second communication section 220, a printing mechanism 230, and the attracting mechanism 204 explained with reference to FIG. 1. The second control section 210 includes a CPU, a ROM, and a RAM. The CPU executes various programs recorded in the ROM or the like using the RAM or the like, whereby the second control section 210 controls the sections of the printing apparatus 200. The second control section 210 may be configured by a single chip or may be configured by a plurality of chips. The second control section 210 may be configured as an SoC together with various functional blocks that cause the printing apparatus 200 to operate. For example, the second control section 210 may include an ASIC instead of the CPU. The CPU and the ASIC may cooperate to realize the second control section 210. The second communication section 220 communicates with other apparatuses connected to the printing apparatus 200 by wire or radio according to various communication protocols. In this embodiment, the second communication section 220 performs communication with the control apparatus 100. The printing mechanism 230 includes the print head 202 and the gantry 203 explained with reference to FIG. 1 and driving circuits of the print head 202 and the gantry 203 and performs a printing operation according to the printing job under the control by the second control section 210.

When the second communication section 220 receives a printing instruction from the control apparatus 100, the second control section 210 specifies a printing start position T (X, Y) and a printing size (H, W) from the printing instruction. The second control section 210 performs control to print a printing target image in a printing region decided by the printing start position T (X, Y) and the printing size (H, W). In the printing apparatus 200, when printing corresponding to one printing instruction by the printing mechanism 230 is completed, the second control section 210 transmits, to the control apparatus 100, via the second communication section 220, a printing completion notification for notifying that the printing is completed. Every time ON and OFF of an attracting operation by the attracting mechanism 204 are switched, the second control section 210 transmits an ON/OFF switching notification to the control apparatus 100 via the second communication section 220. The control apparatus 100 refers to the switching notification when determining whether a medium is replaced. This processing is explained below.

After printing a first image on one medium according to a first printing instruction, when further receiving a second printing instruction, the printing apparatus 200 in this embodiment can further prints, on the same medium, a second image indicated by the second printing instruction. In some case, although the user desires to print the second image in a position not overlapping the first image, at least parts of the first image and the second image are superimposed and printed because designation of printing start positions is inappropriate. The control apparatus 100 in this embodiment can perform printing control processing for preventing such a situation from occurring.

(2) Printing Control Processing in the First Embodiment

Figure 5:
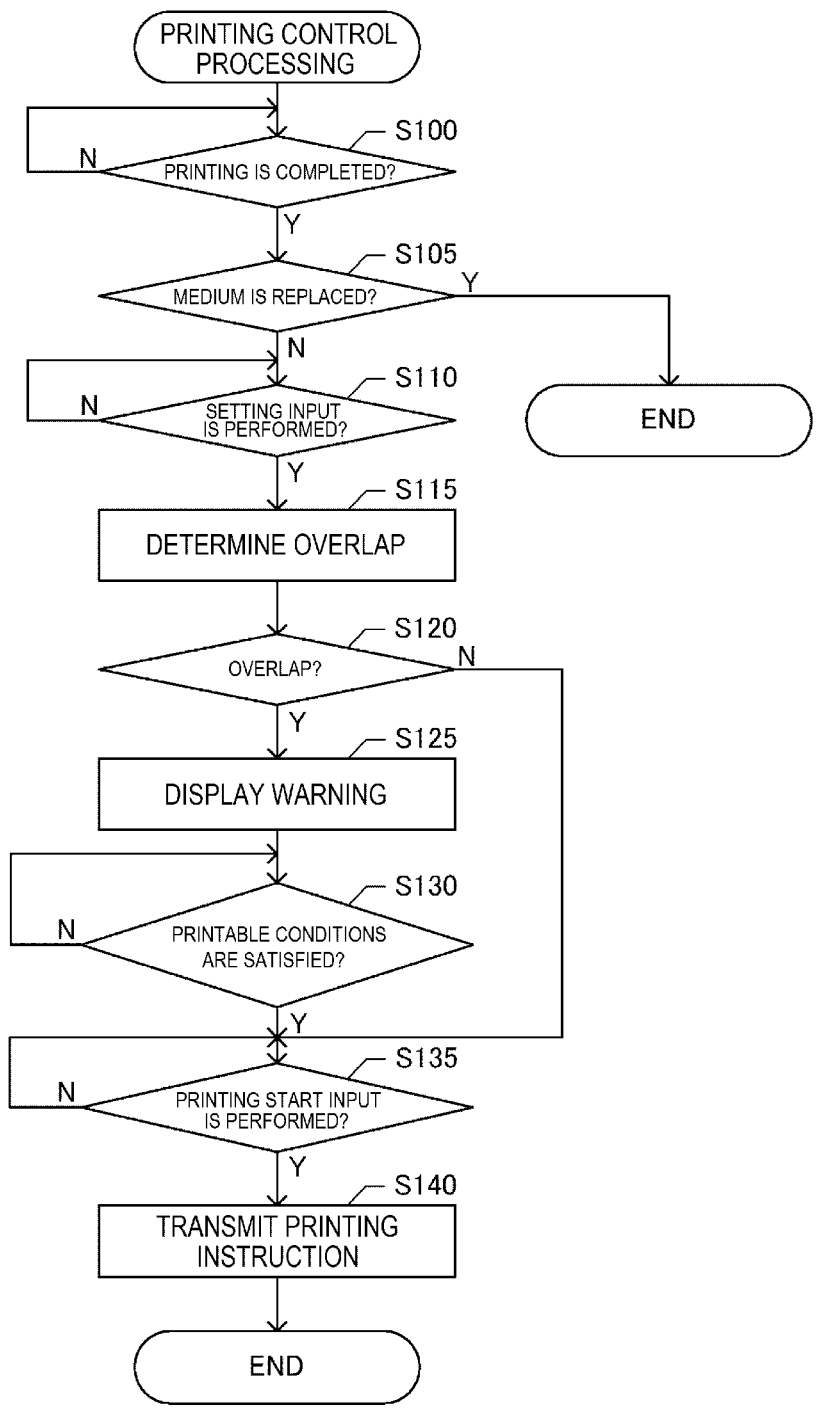
FIG. 5 is a flowchart showing printing control processing.

FIG. 5 is a flowchart showing printing control processing by the first control section 110 of the control apparatus 100. The printing control processing indicates a print production process. In the printing control apparatus, first, the first control section 110 of the control apparatus 100 determines whether printing by the printing apparatus 200 is completed (step S100). When printing corresponding to one printing instruction is completed, the printing apparatus 200 transmits a printing completion notification to the control apparatus 100 via the second communication section 220. When receiving the printing completion notification via the first communication section 120, the first control section 110 of the control apparatus 100 determines that the printing is completed. In the following explanation, a printing target image, printing of which is determined in step S100 as being completed, that is, an image, printing of which is already completed, is referred to as first image. An image corresponding to a printing job designated as a printing target following the first image is referred to as second image.

The first control section 110 stays on standby until the printing is completed (N in step S100). When the printing is completed (Y in step S100), the first control section 110 determines whether a medium is replaced (step S105). The first control section 110 determines based on an ON/OFF switching notification of the attracting mechanism 204 received from the printing apparatus 200 whether the medium is replaced. Specifically, after the printing is completed, when receiving a notification of switching to attraction OFF and subsequently receiving a notification of switching to attraction ON, that is, when attraction is released and resumed, the first control section 110 determines that the medium is replaced. On the other hand, after the printing is completed, when not receiving a switching notification, that is, the attraction is continued, the first control section 110 determines that the medium is not replaced.

When the medium is replaced (Y in step S105), the first control section 110 deletes information concerning a printing position in the past and ends the processing. In this case, the printing control processing is started targeting printing on a new medium. The printing control processing in this case is explained in detail below. When the medium is not replaced (N in step S105), the first control section 110 determines whether a setting input of a printing size and a printing start position is performed (step S110). In this embodiment, when the printing size is input and an X coordinate and a Y coordinate are input as the printing start position on the printing setting screen 300, the first control section 110 determines that the setting input is performed.

The first control section 110 stays on standby until the setting input is performed (N in step S110). When the setting input is performed (Y in step S110), the first control section 110 determines overlap of the first image and the second image on the medium (step S115). Specifically, the first control section 110 specifies a printing region of the first image from a printing start position and a printing size of the first image. The printing job, the printing start position, and the printing size included in the printing instruction transmitted to the printing apparatus 200 are stored in the storing section such as the HDD 130 until the medium is replaced. The first control section 110 calculates the printing region of the first image from the printing start position and the printing size of the first image stored in the storing section and determines whether a printing start position of the second image is included in the printing region of the first image. When the printing start position of the second image is included in the printing region of the first image, the first control section 110 determines that the first image and the second image overlap. On the other hand, when the printing start position of the first image is not included in the printing region of the first image, the first control section 110 determines that the first image and the second image do not overlap.

Figure 6:
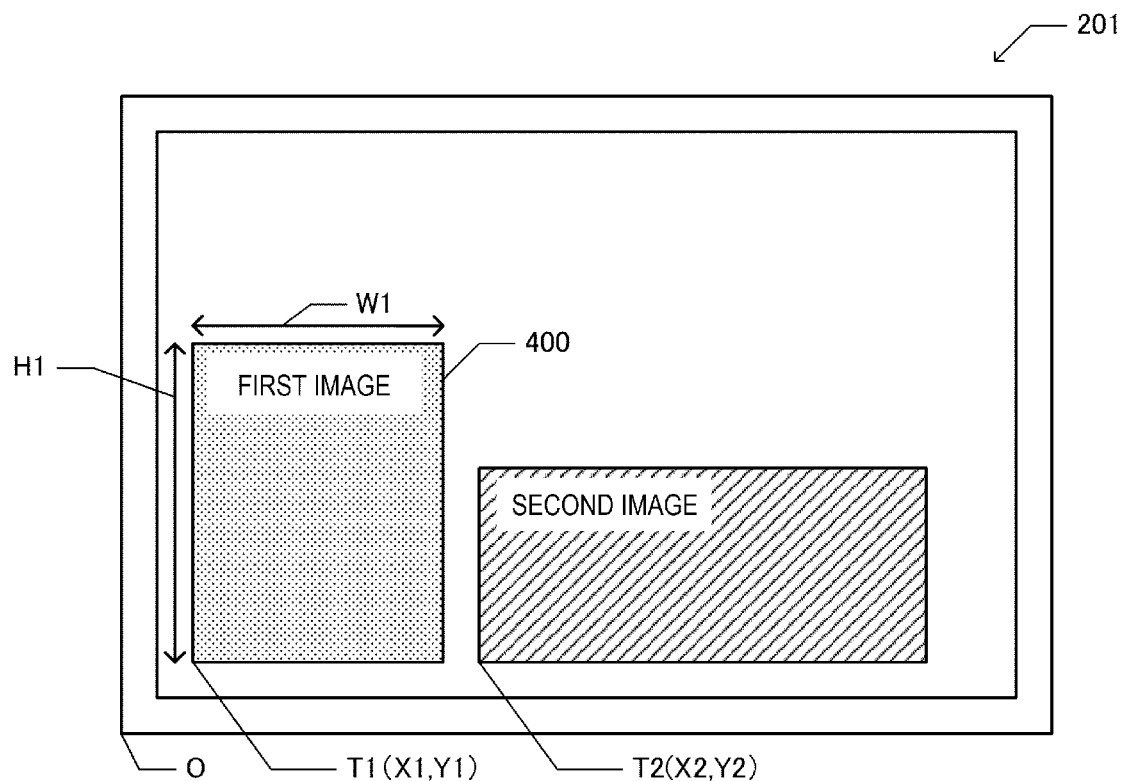
FIG. 6 is a diagram showing an example of a positional relation between a first image and a second image.
Figure 10:
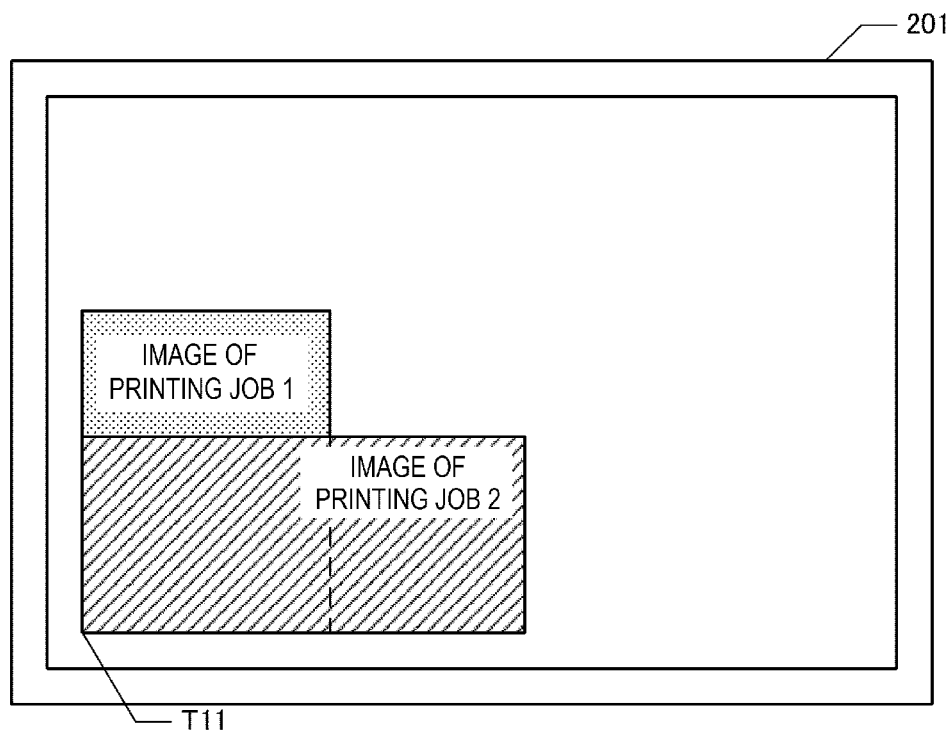
FIG. 10 is an explanatory diagram of related art.
Figure 11:
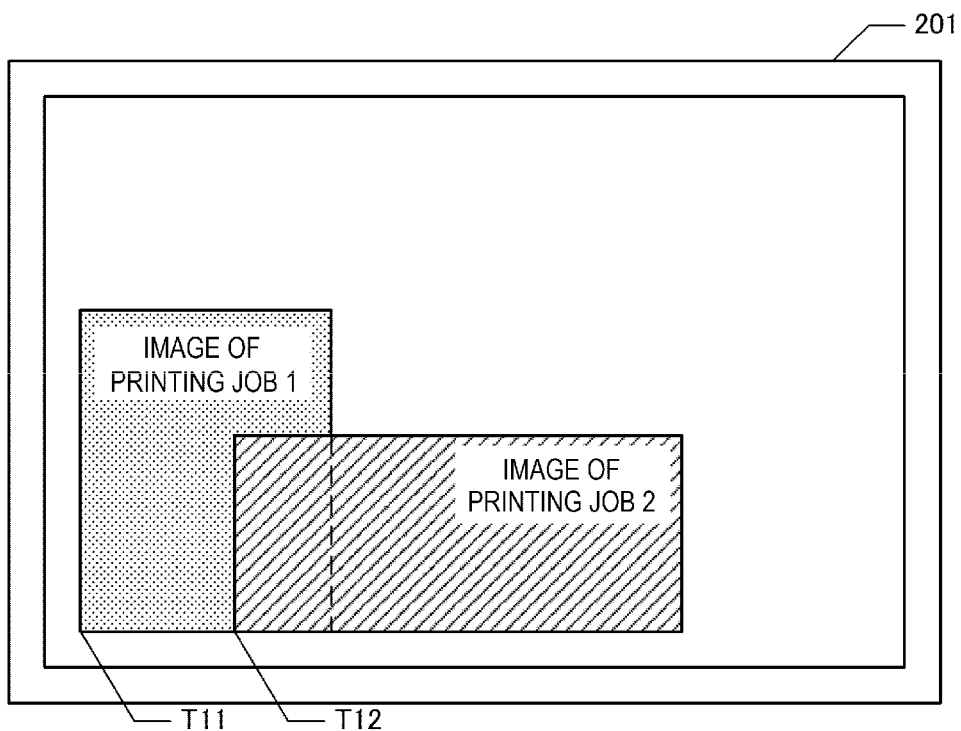
FIG. 11 is an explanatory diagram of related art.

For example, in an example shown in FIG. 6, a printing start position T2 (X2, Y2) of the second image is not included in a printing region 400 decided by the printing start position T1 of the first image and the printing size (W1, H1). Accordingly, in the example shown in FIG. 6, it is determined that the first image and the second image do not overlap. On the other hand, in positional relations shown in FIGS. 10 and 11, it is determined that the first image (the image of the printing job 1) and the second image (the image of the printing job 2) overlap. In this way, when at least parts of the first image and the second image overlap, the first control section 110 determines that the first image and the second image overlap. In other cases, the first control section 110 determines that the first image and the second image do not overlap.

When the two images do not overlap (N in step S120), the first control section 110 advances the processing to step S135. When the two images overlap (Y in step S120), the first control section 110 performs control to perform warning display (step S125). Specifically, the first control section 110 displays warning information on the printing setting screen 300. The warning information is information indicating that two images overlap. In this way, the first control section 110 performs warning when, after the first image is printed, a position within a region where the first image is printed is designated as a printing position of the second image. The warning information notifies the user of possibility of double printing in the same position of one medium.

Figure 7:
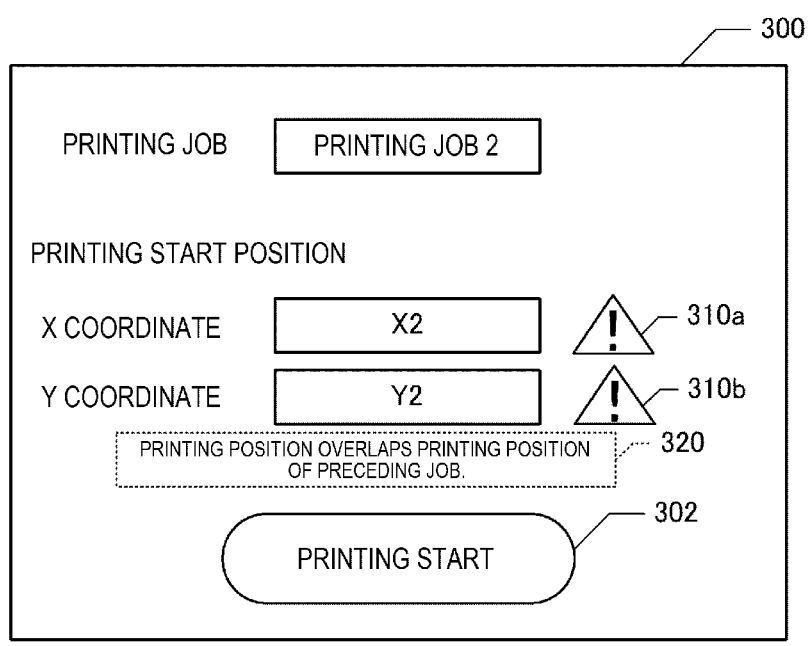
FIG. 7 is a diagram showing an example of warning information.

FIG. 7 is a diagram showing an example of the warning information. In the example shown in FIG. 7, warning icons 310a and 310b and a message 320 are displayed as the warning information. The warning icon 310a is an icon corresponding to an X coordinate and the warning icon 310b is an icon corresponding to a Y coordinate. Consequently, when a printing start position of the printing job 2 is a value input from the user, before the second image is printed, the first control section 110 can notify the user that the two images are printed to overlap each other.

Referring back to FIG. 5, after the warning display, the first control section 110 determines whether printable conditions are satisfied (step S130). The printable conditions are conditions for the first control section 110 to determine that the overlap is eliminated and a printable state is achieved. In this embodiment, two conditions are set as the printable conditions. A first condition is that the input of the printing start position of the second image (the image of the printing job 2) is changed and the overlap is eliminated. A second condition is that the attracting mechanism 204 is turned off and is turned on again. For example, it is possible to perform adjustment to eliminate the overlap by shifting the position of the medium instead of changing the printing position. When the attracting mechanism 204 is turned off and is turned on again, it can be considered that such work is performed by the user. Therefore, the attracting mechanism 204 being turned off and being turned on again is set as the printable condition.

The first control section 110 stays on standby until the printable conditions are satisfied (N in step S130). When the printable conditions are satisfied (Y in step S130), the first control section 110 advances the processing to step S135. By staying on standby until the printable conditions are satisfied in this way, when the two images printed on one medium overlap, the first control section 110 can perform control not to perform printing of the second image on the medium until the predetermined printable conditions are satisfied.

In step S135, the first control section 110 determines whether a printing start input is performed. When the printing start button 302 is selected on the printing setting screen 300, the first control section 110 determines that the printing start input is performed. The first control section 110 stays on standby until the printing start input is performed (N in step S135). When the printing start input is performed (Y in step S135), the first control section 110 transmits the printing instruction including the printing start position, the printing size, and the printing job set by the user operation to the printing apparatus 200 via the first communication section 120 (step S140). When receiving the printing instruction via the second communication section 220, the printing apparatus 200 performs printing according to the printing instruction to produce a print.

As explained above, when it is likely that overlap occurs, the first control section 110 can warn to that effect. Further, by performing control not to receive the printing start input until the overlap is eliminated, the first control section 110 can prevent useless printing from being performed.

On the other hand, when the medium is replaced in step S105 (Y in step S105), the first control section 110 ends the printing control processing without performing the processing in steps S110 to S130. That is, when the medium is replaced, the first control section 110 does not set, as a warn target, overlap of the first image printed on the medium before the replacement and an image (referred to as third image) designated as a printing target after the replacement. This is because, when the medium is replaced, even if a printing position of the third image is within the printing region of the first image, a situation in which the images overlap does not occur.

As explained above, in the printing system 10 in this embodiment, at a point in time before the second image is printed, the control apparatus 100 performs warning of possibility of double printing in the same position of one medium. Therefore, without adding a special apparatus such as a camera or a projector, it is possible to prevent a situation in which the images are unintendedly superimposed and printed because of a setting mistake of the printing start position. That is, it is possible to prevent the double printing without spending high cost.

(3) Second Embodiment

About the printing system 10 in a second embodiment, differences from the printing system 10 in the first embodiment are mainly explained. The printing system 10 in the second embodiment performs warning of possibility of double printing in the same position of one medium without determining whether the first image and the second image overlap on the medium.

Figure 8:
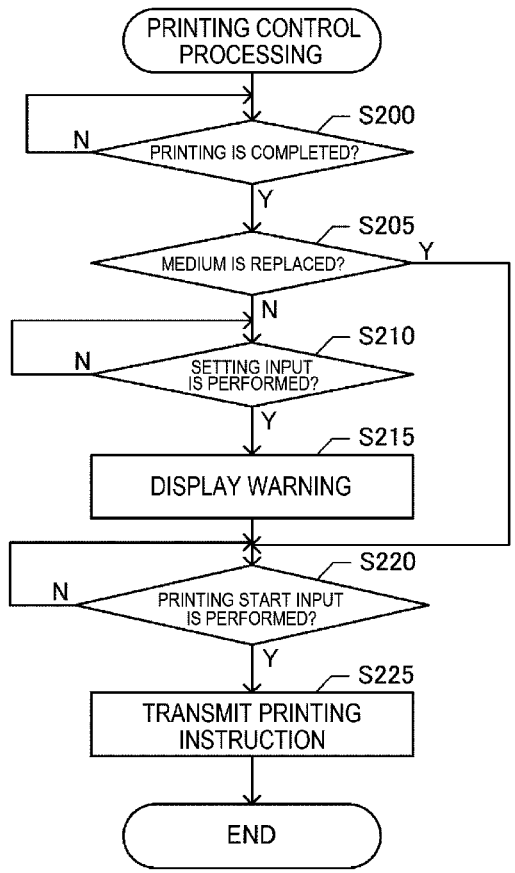
FIG. 8 is a flowchart showing printing control processing according to a second embodiment.

FIG. 8 is a flowchart showing printing control processing according to the second embodiment. Processing in steps S200 to S210 is the same as the processing in steps S100 to S110 of the printing control processing in the first embodiment explained with reference to FIG. 5 in the first embodiment. When the medium is replaced in step S205, the first control section 110 advances the processing to step S220.

Figure 9:
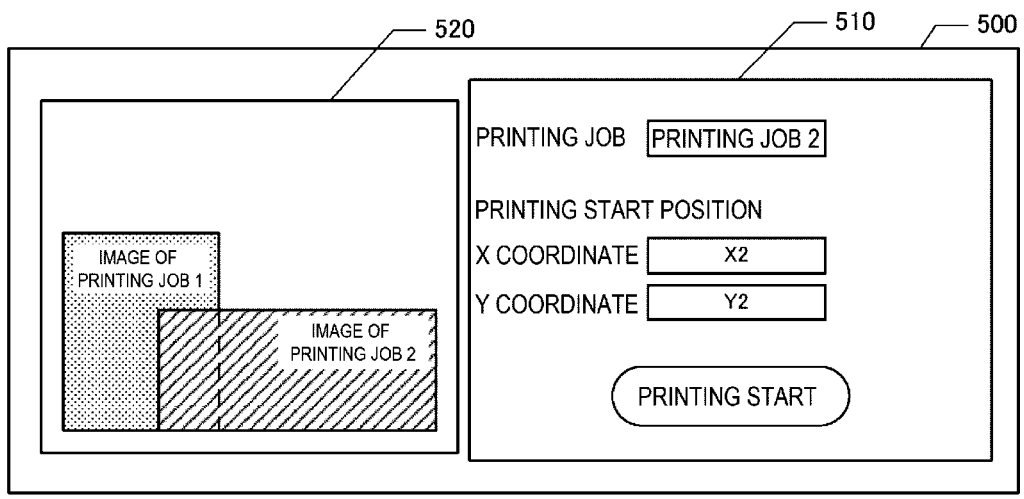
FIG. 9 is a diagram showing an example of a warning display screen according to the second embodiment.

When the setting input is performed (Y in step S210), the first control section 110 preforms warning display without performing overlap determination (step S215). FIG. 9 is a diagram showing an example of a warning display screen according to the second embodiment. As shown in FIG. 9, a setting region 510 for displaying content same as the content of the printing setting screen 300 according to the first embodiment is provided on a warning display screen 500. Further, an image display region 520 for displaying an image showing a positional relation between the first image and the second image on the medium corresponding to a printing start position input to the setting region 510 is provided on the warning display screen 500.

Referring back to FIG. 8, after performing the warning display, the first control section 110 advances the processing to step S220. Processing in steps S220 and S225 is the same as the processing in steps S135 and S140 in FIG. 5.

As explained above, in the printing system 10 according to the second embodiment, as in the printing system 10 according to the first embodiment, the control apparatus 100 performs warning of possibility of double printing in one medium position at a point in time before the second image is printed. Consequently, it is possible to prevent the double printing without adding a special apparatus, that is, without spending high cost.

Further, in the printing system 10 in the second embodiment, the control apparatus 100 displays an image showing a positional relation between two images. Therefore, when the two images overlap, a user can visually easily grasp in which direction and in which degree the printing start position should be shifted to enable the overlap to be eliminated.

(4) Other Embodiments

The embodiments explained above are examples for carrying out the present disclosure. Other various embodiments can be adopted. For example, the printing apparatus 200 may be a multifunction peripheral including a scanner function and a FAX function. The function of the first control section 110 of the control apparatus 100 may be realized by the second control section 210 of the printing apparatus 200. In this case, warning is performed in a UI section provided in the printing apparatus 200.

In the printing apparatus 200 in this embodiment, the gantry 203 moves on the media table 201 functioning as the printing mechanism 230. However, the printing mechanism 230 only has to perform printing while moving relatively to a medium placed on the media table 201. That is, the media table 201 may move in the sub-scanning direction Q in a state in which the gantry 203 is fixed. The position of the print head 202 may be fixed and the media table 201 may move in the main scanning direction P and the sub-scanning direction Q. The printing mechanism 230 may be a printing mechanism of not a serial type but a line type that does not move in the main scanning direction P. The attracting mechanism may perform attraction using other means for generating a negative pressure with a fan or performing attraction with static electricity besides the attraction performed using the pump. The attraction performed using the pump and the attraction performed using the other means may be combined to perform the attraction.

The medium only has to be a printing medium on which printing is performed and is not limited to the printing paper. As other examples, the medium may be circular paper and elliptical paper. The printing medium may be cloth or the like.

In the first embodiment, the first control section 110 of the control apparatus 100 displays the warning information on the display section. However, the first control section 110 only has to perform warning to the user. A form of the warning is not limited to the embodiment. For example, when the control apparatus 100 includes a speaker, the first control section 110 may output, from the speaker, as the warning information, sound for informing possibility of double printing in the same position of one medium.

In this embodiment, after the first image is printed, when the printing start position of the second image is included within the printing range of the first image, the control apparatus 100 determines that the two images overlap and performs the warning. However, timing for performing the warning is not limited to the embodiment. For example, it is assumed that the control apparatus 100 adopts a procedure for performing an input of printing sizes and printing start positions corresponding to two images to be printed on one medium before starting printing of both of the two images. In this case, the control apparatus 100 may perform the warning at timing after the printing sizes and the like of the respective two images are input and before the printing start.

The control apparatus 100 only has to perform the warning when two or more images printed on one medium overlap. That is, warning target overlap is not limited to the overlap of the two images and may be overlap of three or more images. The warning target overlap may be overlap of two or more images, printing order of which is not continuous. For example, it is assumed that printing sizes and the like corresponding to three images to be printed on one medium are input. In this case, overlap of the three images and overlap of an image printed first and an image printed third are warning targets. Further, the control apparatus 100 may determine overlap considering not only external shapes of images but also contents of the images. Specifically, the control apparatus 100 specifies, in a printing region of the image printed first, a blank region where printing is not performed, that is, ink is not applied. The control apparatus 100 specifies, in a printing region of an image printed second, an actual printing region where printing is performed, that is, the ink is applied. When the actual printing region of the second image is included in the blank region of the first image, the control apparatus 100 may determine that the images do not overlap and may not perform the warning. For example, when the blank region is present in the center of the first image and the actual printing region of the second image is included in the blank region, the control apparatus 100 may determine that the images do not overlap and may not perform the warning.

The control apparatus 100 only has to perform the warning when a printing position where the second image is printed is designated within a region where the first image is printed on the medium. The printing position is not limited to the printing start position. That is, the control apparatus 100 only has to perform the warning when the printing position of the second image is designated such that at least a part of the printing position of the second image is a position within the region where the first image is printed.

The printable conditions are not limited to the first embodiment. As other examples, a confirmation button is displayed near the warning icons 310a and 310b on the printing setting screen 300. When the user desires printing in an overlap state of images, the user may press the confirmation button. In this case, the pressing of the confirmation button may be defined as the printable condition. In this way, the printable conditions may include, as a condition of a printable state, an input of an instruction for permitting the printing in the overlap state. Consequently, the first control section 110 is also adaptable when the user desires to print images to overlap.

In this embodiment, the control apparatus 100 determines according to ON and OFF of the attracting mechanism 204 whether the medium is replaced. However, a method of determining presence or absence of the replacement is not limited to the embodiment. As another example, the printing apparatus 200 may include a human sensor and the control apparatus 100 may determine based on an output of the human sensor whether the medium is replaced. For example, the control apparatus 100 may have a time to be usually required for the replacement as a threshold in advance and, when detecting a human body near the printing apparatus 200 for a time equal to or more than the threshold, determine that the medium is replaced. This is because it can be considered that a person approaches the printing apparatus 200 for work for replacing the medium. As the human sensor, a human sensor set around the media table 201 or on the media table 201 may be used in order to detect a human body around the media table 201 in order to prevent an accident of contact of the printing apparatus 200 in operation and a person. The human sensor detects heat (an infrared ray) emitted by a human body. As another example, the human sensor may be set in the media table 201 and detect static electricity at a time when a human body touches the media table 201. When the human sensor detects a human body, the second control section 210 of the printing apparatus 200 transmits a detection notification to the control apparatus 100 via the second communication section 220. When receiving the detection notification, the control apparatus 100 determines that the medium is replaced. The control apparatus 100 may determine, with these methods, whether the medium is replaced or may determine, with a combination of these methods, whether the medium is replaced.

In the second embodiment, the control apparatus 100 prints the first image and, thereafter, displays the image indicating the positional relation. However, the control apparatus 100 only has to display the image indicating the positional relation. Timing for displaying the image indicating the positional relation is not limited to the embodiment. For example, it is assumed that the input of the printing start positions and the like is performed before the printing of all the images is started as explained above. In this case, when the input of the printing start positions and the like of the two images is performed before the printing start, the control apparatus 100 may display, based on the input, the image indicating the positional relation.

In the second embodiment, the control apparatus 100 displays the image indicating the positional relation. However, the control apparatus 100 only has to output information indicating the positional relation. For example, the control apparatus 100 may display, on the display section, text information indicating that the two images overlap or do not overlap. When the control apparatus 100 includes a speaker, the first control section 110 may output sound of reading the text information from the speaker.

When determining that the two images overlap in the first embodiment, the control apparatus 100 may display the image indicating the positional relation between the two images like the warning display screen 500 explained with reference to FIG. 9 in the second embodiment.

Further, the embodiments can be realized as a program and a method. The system, the program, and the method explained above are realized as an independent apparatus in some cases and are realized using components included in a plurality of apparatuses in other cases. The system, the program, and the method include various forms. The system, the program, and the method can be changed as appropriate, for example, a part of the system, the program, and the method is software and a part of the system, the program, and the method is hardware. Further, an invention is established as a recording medium for a program for controlling the system. Naturally, the recording medium for the program may be a magnetic recording medium or may be a semiconductor memory. All recording media to be developed in future can be considered completely the same.

What is claimed is:

1. A printing system comprising:
   a media table on which a medium is placed;
   a printing mechanism configured to perform printing while moving relatively to the medium placed on the media table; and
   a processor configured to determine presence or absence of possibility of double printing, in which subsequent printing is performed on a same position of a same medium as preceding printing, and perform warning when the possibility is present.

2. The printing system according to claim 1, wherein the control section performs the warning when positions of two or more images printed on the medium overlap.

3. The printing system according to claim 2, wherein the control section performs the warning when, after a first image is printed on the medium, a position within a region where the first image is printed is designated as a printing position of a second image designated as a printing target.

4. The printing system according to claim 3, wherein the control section determines whether the medium is replaced and does not set, as a target of the warning, overlap of the first image and a third image designated as a printing target after the replacement of the medium.

5. The printing system according to claim 4, further comprising an attracting mechanism configured to attract the medium to the media table, wherein
   when the attraction is released after the printing of the first image is performed and the attraction is resumed, the control section determines that the medium is replaced.

6. The printing system according to claim 4, further comprising a human sensor configured to detect a human body around the media table, wherein
   the control section performs the determination based on an output of the human sensor.

7. The printing system according to claim 1, wherein, when two or more images printed on the medium overlap, the control section performs control not to print at least one image of the two images on the medium until a predetermined printable condition is satisfied.

8. The printing system according to claim 1, wherein the control section performs the warning by outputting information indicating a positional relation between two images printed on the medium.

9. The printing system according to claim 8, wherein the information indicating the positional relation is an image indicating the positional relation of two or more images printed on the medium.

10. A non-transitory computer-readable storage medium storing a printing control program, the printing control program causing a computer, which controls a printing mechanism that performs printing while moving relatively to a medium placed on a media table, to execute:
    a step of controlling the printing mechanism; and
    a step of performing warning of possibility of double printing, in which subsequent printing is performed on a same position of a same medium as preceding printing.

11. A print producing method comprising:
    a printing step for producing a print by performing printing while moving relatively to a medium placed on a media table; and
    a warning step for performing warning of possibility of double printing, in which subsequent printing is performed on a same position of a same medium, as preceding printing.

* * * * *